Nov. 24, 1959  K. MEYER  2,913,761
APPARATUS FOR TRANSFERRING MATERIAL FROM
A HIGHER TO A LOWER LEVEL
Filed May 2, 1956

INVENTOR.
Kurt Meyer
BY
Christy, Parmelee, Strickland
attorneys,

United States Patent Office 2,913,761
Patented Nov. 24, 1959

2,913,761

APPARATUS FOR TRANSFERRING MATERIAL FROM A HIGHER TO A LOWER LEVEL

Kurt Meyer, Frankfurt am Main, Germany, assignor to Dravo Corporation, Pittsburgh, Pa., a corporation of Pennsylvania Application May 2, 1956, Serial No. 582,255

1 Claim. (Cl. 18—1)

This invention relates to material handling and is for a method and apparatus especially useful in transferring fragile material from a forming apparatus to a sintering apparatus.

In the sintering of certain finely-divided substances, such as flue dust, finely-divided ores, and other substances by a down draft sintering method, it is desirable that the finely-divided material when charged onto the conveyor be in the form of small pellets. To this end it is a common procedure to use some mechanism, as for example revolving drums, mixers or rotating plate arrangements to agglomerate the finely-divided material into small lumps or pellets. These raw pellets are easily broken and crumbled, and this is especially true when they are transferred from the pelletizing apparatus to the sintering band or conveyor or other receiving apparatus.

The object of the present invention is to provide a transfer means and method by which the previously formed pellets in a raw condition are transferred from the apparatus by which they are formed to the sintering conveyor or other receiving means with a minimum of damage, and in fact to provide a method and apparatus by which their condition may be improved, and finely-divided substances even formed into pellets during the period of transfer.

The invention, while not being so limited, will for purposes of explanation be described in connection with the transfer of material from a pellet-forming unit to a horizontally moving sintering level or conveyor.

The invention may be more fully understood by reference to the accompanying drawing in which.

Figure 1:
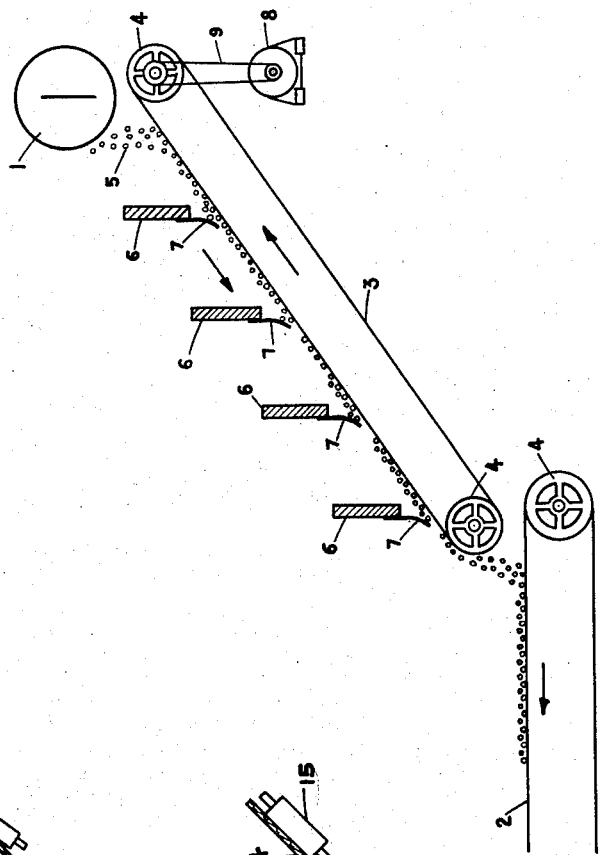
Fig. 1 is a schematic side elevation, partly in section, of an apparatus for practicing the invention.

In the drawing, with reference first to Fig. 1, 1 designates schematically an apparatus by which finely-divided material is formed into pellets. This may be a revolving drum arrangement or any other mechanisms commonly used for this purpose. It is elevated above the conveyor or other equipment to which the pellets are to be transferred. 2 designates a horizontally moving conveyor at a lower level than the apparatus 1, but instead of 2 being a conveyor it may be another form of receiving apparatus. The conveyor 2 may conveniently be a continuous sintering band or like conveyor. According to the present invention an endless belt 3 passing over pulleys 4 has its upper end positioned to receive the pellets or material from the apparatus 1, and its lower end overhanging the conveyor 2 so as to discharge material thereon. The belt 3 is preferably at a substantial inclination as shown in the figure, the angle preferably being greater than the angle of repose of the material, which is of the order of 22° to 30°, the exact inclination depending upon plant conditions and the material being handled. As indicated by the arrow, the upper reach of the belt moves upwardly, i.e., from the lower end toward the upper end, so that it tends to move the material in a direction opposed to gravity. In other words the belt is at an angle and operated at such speed that though the material tends to roll down the belt freely, the upward movement of the belt retards the downward feed of the material so that it moves down at a controlled speed and under regulated conditions. Consequently the velocity of the material when it falls onto the conveyor 2 is low, and the pellets are not broken or destroyed. If loose powdered material is discharged onto the conveyor along with the pellets, the pellets will roll on such loose material and pick up additional powdered material, and the size thereof will be thus increased.

Figure 2:
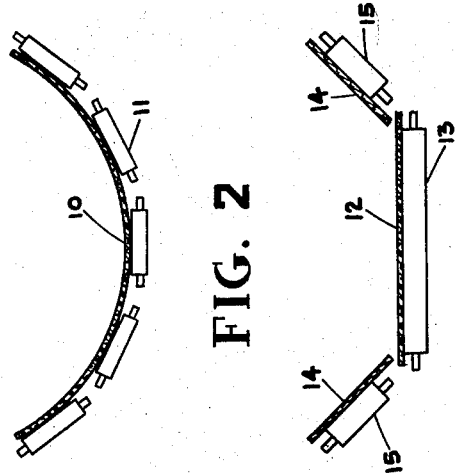
Fig. 2 is a transverse section through a modified form of conveyor.

The belt 3 may be flat or nearly so, but if it is important that the shape of the pellets be kept closely to an exact sphere, the belt is concaved as shown in Fig. 2, where only the top reach of the belt, designated 10, is shown supported on troughing rollers 11. A transverse concavity in the belt causes the pellets to roll from side to side and maintain a more nearly spherical shape.

Figure 3:
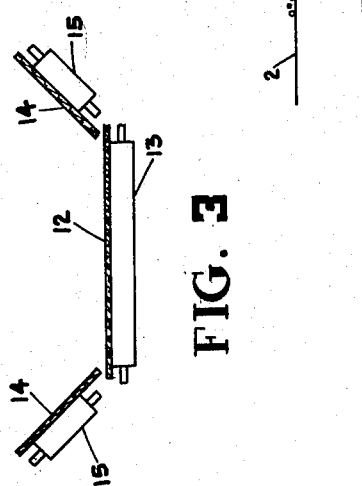
Fig. 3 is a transverse section of another modified form of conveyor.

A similar result can be obtained by the arrangement shown in Fig. 3 where there is a middle belt 12 carried on roller 13 and two side belts 14 carried on rollers 15. If desired, the side belts may be operated at a different speed from the middle one.

In some cases the apparatus 1 may charge the finely-divided material in a proper condition to agglomerate onto the belt. The slope of the belt will be greater than the angle of repose of the material on the belt so that the material will not be carried upwardly and over the upper end of the belt, but its fall will be retarded and the particles will roll on one another and tend to agglomerate into pellets as the material descends. The fines tend to cling to the belt and be carried upwardly or slide down it with retarded speed, while larger lumps or pellets tend to roll more freely, and as they roll over the fines, they pick up additional material.

In some cases one or more transversely disposed baffles 6 may be arranged over the conveyor, and these baffles may be provided with depending rubber or other flexible or resilient flaps 7 that extend down into the path of the material and tend to further retard its downward movement and increase the rolling action of the particles on the conveyor. Any suitable means for driving the belt 3 may be provided, a motor 8 connected through a drive belt 9 being shown.

Thus it will be seen that the invention provides a simple method and apparatus for transferring material from a higher level to a lower one under conditions which will prevent the material, if it has been agglomerated into loosely formed pellets, from being damaged, and by which loose material may be actually formed into pellets as it is transferred. Thus the material is charged onto the sintering band or other apparatus in a desirable condition to be sintered.

What is claimed as new is:

Apparatus for transferring pellets of finely-divided mineral material from a higher level to a lower one comprising a conveyor belt of trough-like section disposed at an angle greater than the angle of repose of the material, said conveyor belt having its lower end positioned over a receiving means, means for discharging previously formed pellets onto the upper end of the inclined conveyor belt, means for driving the belt in a direction opposed to the gravitational movement of the material down the belt, fixed flexible baffles extending crosswise over the belt at intervals along its length for arresting the acceleration of the pellets as they roll down the belt.

(References on following page)

References Cited in the file of this patent

UNITED STATES PATENTS

| | | |
|---|---|---|
| 771,443 | Perkiewicz | Oct. 4, 1904 |
| 2,052,329 | Wendeborn | Aug. 25, 1936 |
| 2,472,551 | Smith | June 7, 1949 |
| 2,553,714 | Lucas | May 22, 1951 |
| 2,709,833 | Wiklund | June 7, 1955 |

FOREIGN PATENTS

| | | |
|---|---|---|
| 120,002 | Sweden | Oct. 28, 1947 |